(12) United States Patent
Gormley

(10) Patent No.: US 12,331,701 B1
(45) Date of Patent: Jun. 17, 2025

(54) THRUST REVERSER BLOCKER DOOR WITH FAIRING

(71) Applicant: Rohr, Inc., Chula Vista, CA (US)

(72) Inventor: Timothy Gormley, Bonita, CA (US)

(73) Assignee: ROHR, INC., Chula Vista, CA (US)

( * ) Notice: Subject to any disclaimer, the term of this patent is extended or adjusted under 35 U.S.C. 154(b) by 0 days.

(21) Appl. No.: 18/601,267

(22) Filed: Mar. 11, 2024

(51) Int. Cl.
F02K 1/76 (2006.01)

(52) U.S. Cl.
CPC .................. *F02K 1/766* (2013.01)

(58) Field of Classification Search
CPC . F02K 1/766; F02K 1/763; F02K 1/76; F02K 1/70; F02K 1/72; F02K 1/74
See application file for complete search history.

(56) References Cited

U.S. PATENT DOCUMENTS

| | | | |
|---|---|---|---|
| 3,511,055 A | 5/1970 | Timms | |
| 3,608,314 A | 9/1971 | Colley | |
| 3,831,376 A | 8/1974 | Moorehead | |
| 5,228,641 A | 7/1993 | Remlaoui | |
| 5,309,711 A * | 5/1994 | Matthias | F02K 1/72 239/265.29 |
| 6,036,238 A | 3/2000 | Lallament | |
| 6,895,742 B2 | 5/2005 | Lair | |
| 7,124,981 B2 * | 10/2006 | Parham | F02K 1/70 244/110 B |
| 8,109,467 B2 * | 2/2012 | Murphy | F02K 1/72 244/110 B |
| 9,127,623 B2 * | 9/2015 | Peyron | F02K 1/72 |
| 9,518,534 B2 | 12/2016 | Kusel | |
| 9,739,235 B2 | 8/2017 | Gormley | |
| 9,938,929 B2 * | 4/2018 | Gormley | F02K 1/80 |
| 10,006,405 B2 | 6/2018 | Stuart | |
| 10,138,843 B2 * | 11/2018 | Gormley | F02K 1/72 |
| 10,533,519 B2 * | 1/2020 | Gormley | F02K 1/763 |
| 10,794,328 B2 | 10/2020 | Gormley | |
| 10,895,220 B2 | 1/2021 | Gormley | |
| 11,566,584 B1 * | 1/2023 | Gormley | F02K 1/006 |
| 11,835,015 B2 * | 12/2023 | Gormley | F02K 1/625 |

(Continued)

FOREIGN PATENT DOCUMENTS

| | | | |
|---|---|---|---|
| CN | 116085141 A | 5/2023 | |
| EP | 3018327 B1 | 4/2018 | |

(Continued)

*Primary Examiner* — Craig Kim
(74) *Attorney, Agent, or Firm* — Getz Balich LLC

(57) ABSTRACT

An assembly for an aircraft propulsion system includes a translating structure and a thrust reverser. The thrust reverser includes a blocker door, an actuation linkage and a fairing. The blocker door is pivotally coupled to the translating structure. The blocker door includes a door surface and a channel projecting into the blocker door from the door surface. The door surface forms an outer peripheral boundary of a flowpath when the translating structure is stowed. The door surface projects into the flowpath when the translating structure is deployed. The actuation linkage is pivotally coupled to the blocker door. The actuation linkage is disposed in the channel when the translating structure stowed. The fairing projects away from the door surface into the flowpath. The fairing forms an aerodynamic cover over the channel when the translating structure is stowed.

14 Claims, 17 Drawing Sheets

(56) References Cited

U.S. PATENT DOCUMENTS

| | | | |
|---|---|---|---|
| 2007/0007388 A1 | 1/2007 | Harrison | |
| 2010/0270428 A1 | 10/2010 | Murphy | |
| 2013/0264399 A1 | 10/2013 | Wingett | |
| 2014/0353399 A1 | 12/2014 | Stuart | |
| 2015/0267639 A1* | 9/2015 | Gormley | F02K 1/72 |
| | | | 60/226.2 |
| 2015/0267641 A1* | 9/2015 | Gormley | F02K 1/766 |
| | | | 239/265.19 |
| 2016/0245228 A1 | 8/2016 | Gormley | |
| 2017/0138304 A1* | 5/2017 | Gormley | F02K 1/72 |
| 2017/0198659 A1 | 7/2017 | Gormley | |
| 2017/0292474 A1 | 10/2017 | Davies | |
| 2017/0298871 A1 | 10/2017 | Sawyers-Abbott | |
| 2018/0258881 A1 | 9/2018 | Schaefer | |
| 2020/0003151 A1* | 1/2020 | Carr | F02K 1/72 |
| 2020/0003154 A1* | 1/2020 | Carr | F02K 1/763 |
| 2020/0018258 A1 | 1/2020 | Aziz | |
| 2020/0400098 A1* | 12/2020 | Gormley | F02K 1/763 |
| 2023/0106521 A1* | 4/2023 | Gormley | F02K 1/72 |
| | | | 239/265.33 |
| 2024/0265272 A1* | 8/2024 | Cristache | G07C 9/00174 |

FOREIGN PATENT DOCUMENTS

| | | |
|---|---|---|
| EP | 3051112 B1 | 4/2020 |
| FR | 3077100 B1 | 1/2020 |
| GB | 130875 A | 8/1919 |
| GB | 892483 A | 3/1962 |

\* cited by examiner

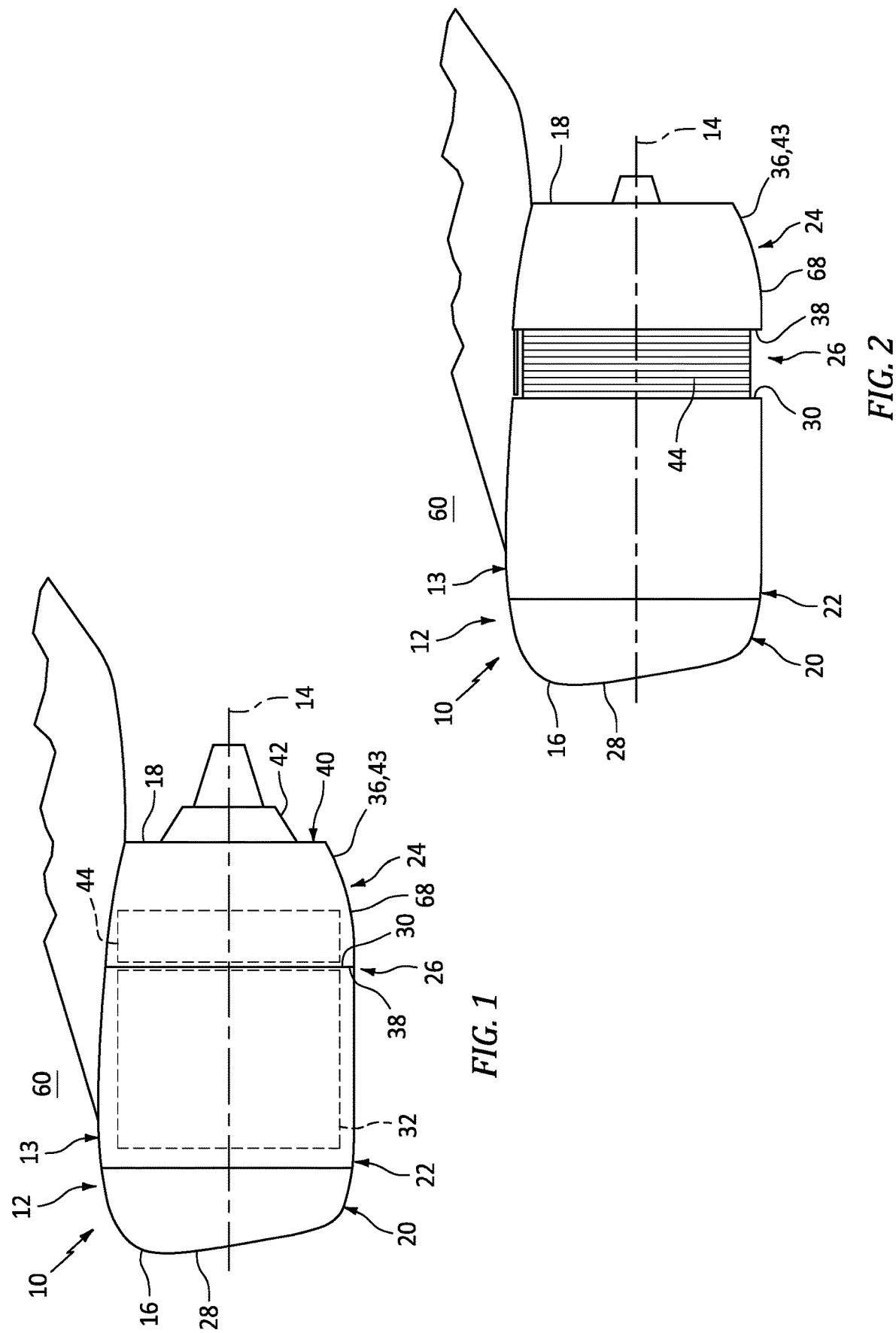

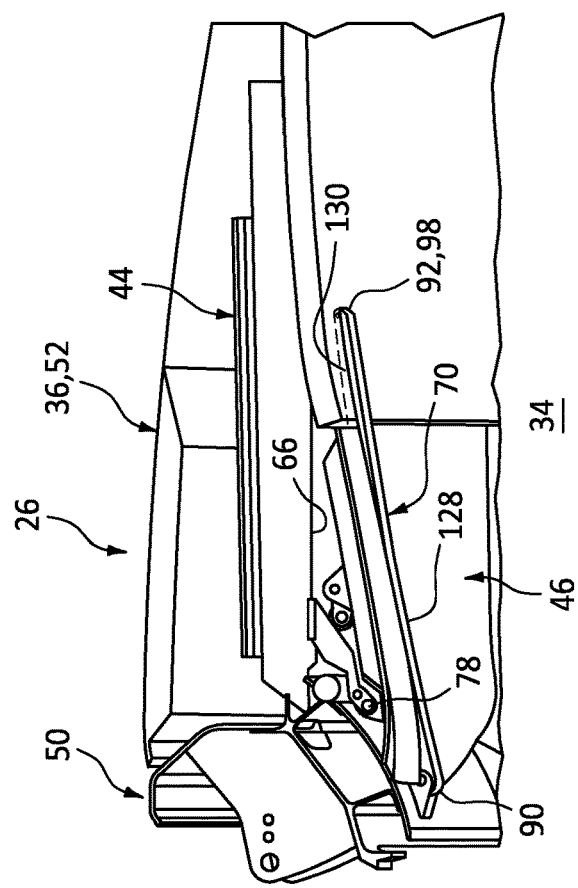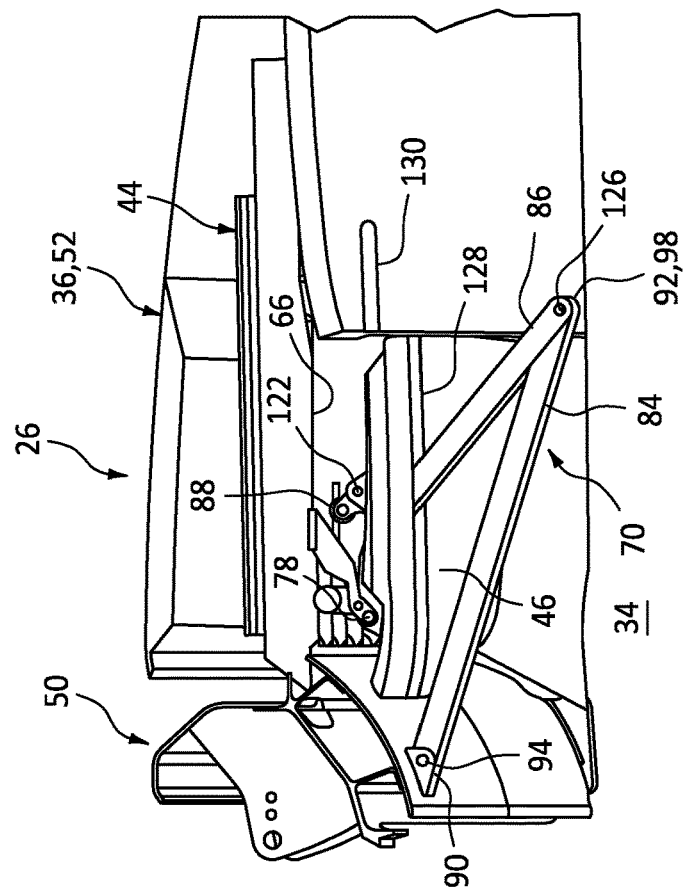

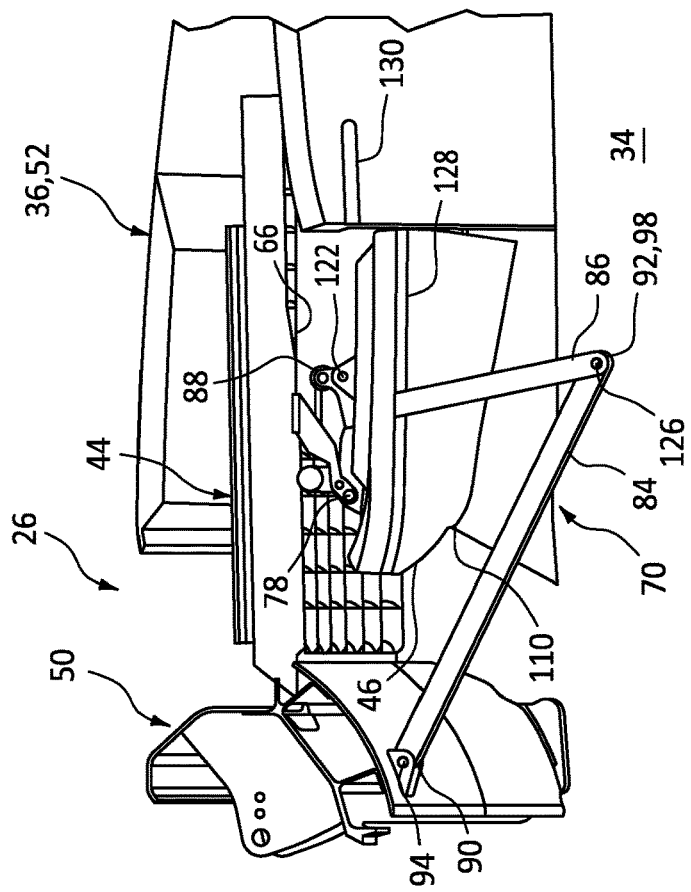
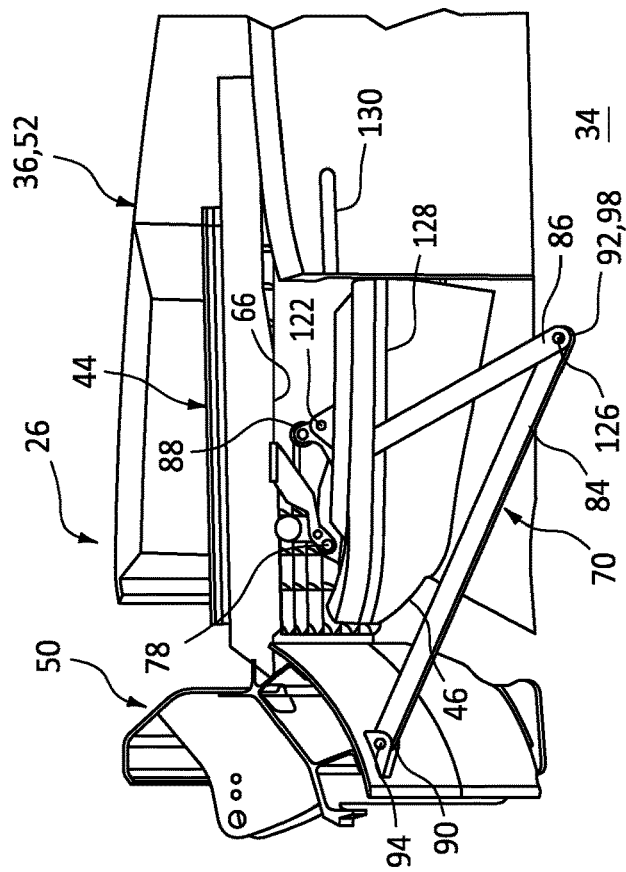
FIG. 6D
FIG. 6C

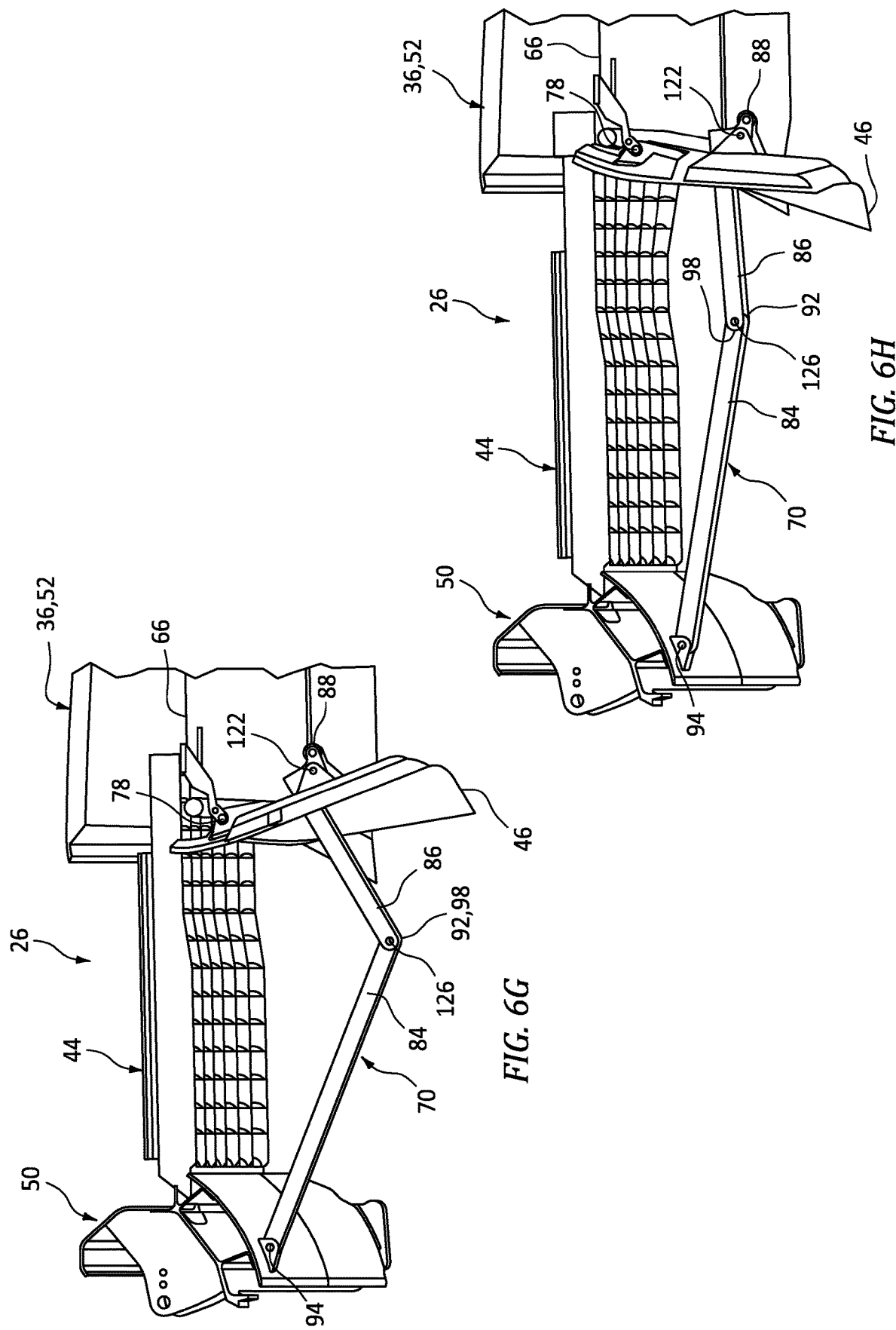

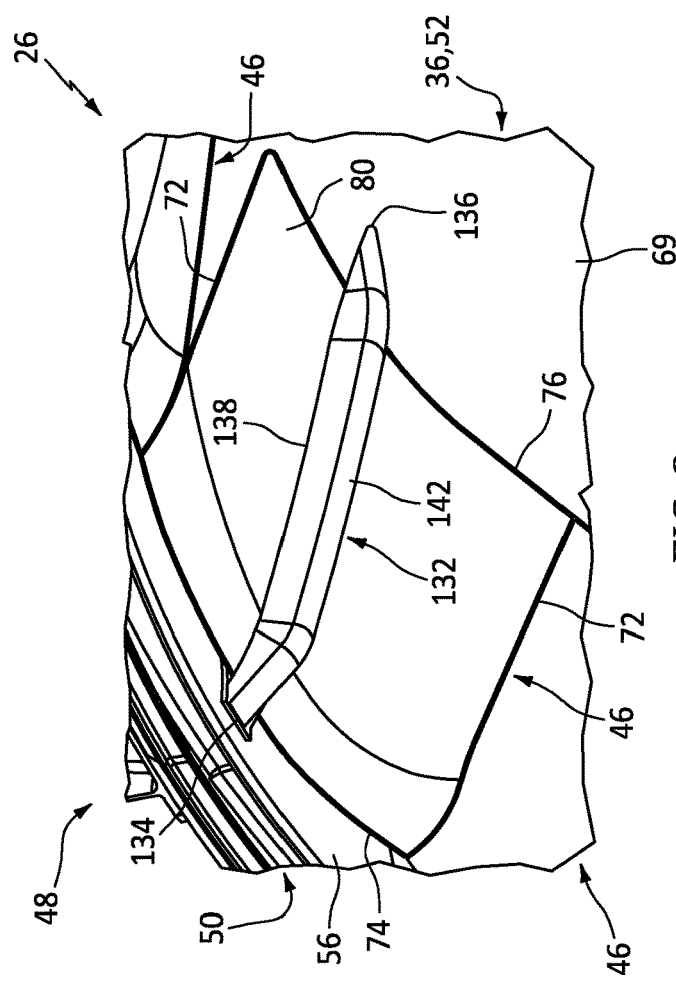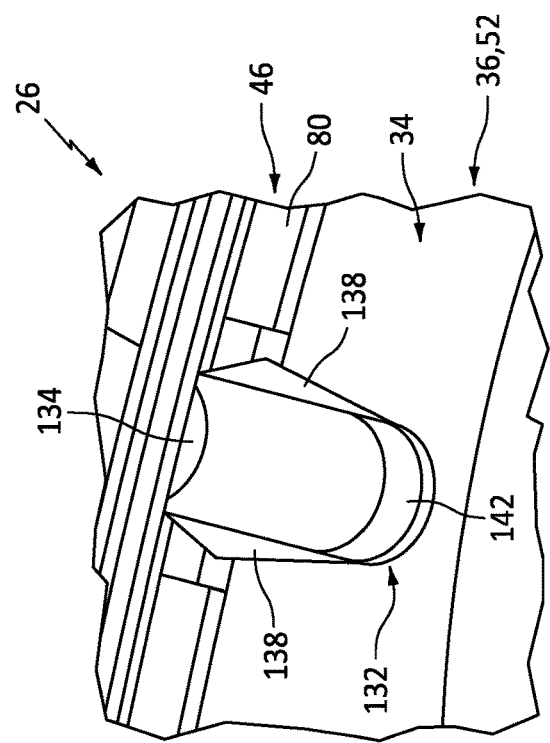

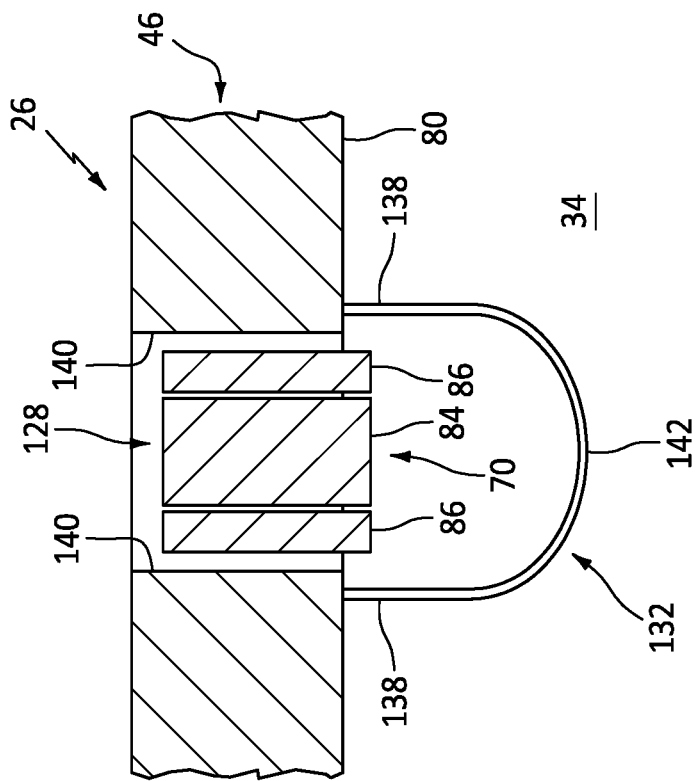
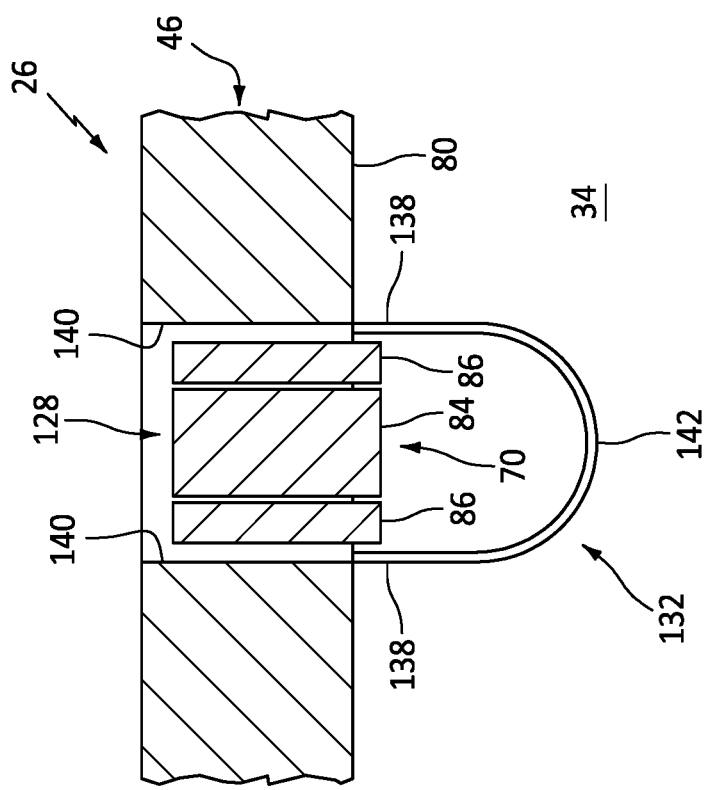

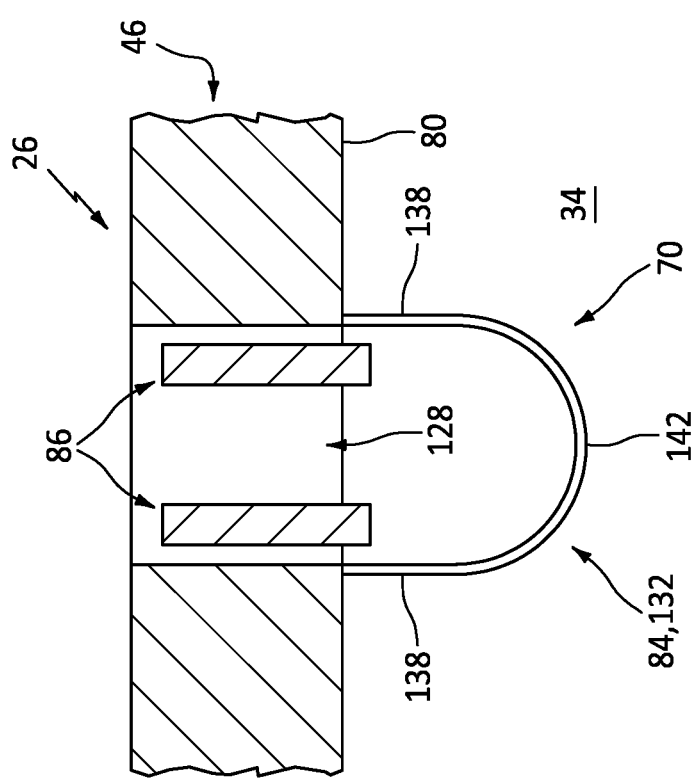
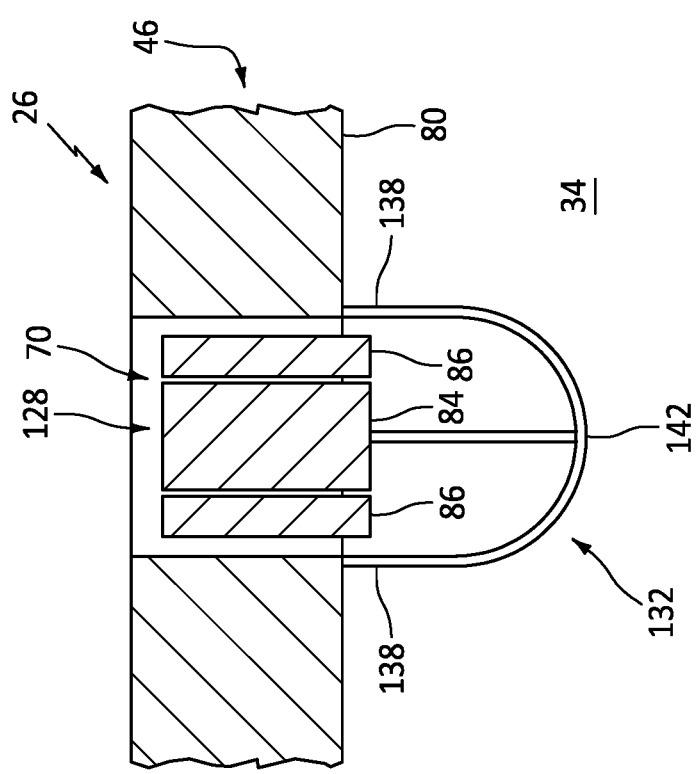

THRUST REVERSER BLOCKER DOOR WITH FAIRING

BACKGROUND

1. Technical Field

This disclosure relates generally to an aircraft propulsion system and, more particularly, to a thrust reverser for an aircraft propulsion system.

2. Background Information

An aircraft propulsion system may include a thrust reverser to aid in aircraft landing. A typical thrust reverser includes a plurality of blocker doors, which pivot inward into a bypass flowpath from stowed positions to deployed positions. The pivoting of the blocker doors may be facilitated using drag links. A typical drag link is connected to an inner fixed structure at one end, and connected to a respective blocker door at the other end. As a result, even when the thrust reverser is not being used, the drag links extend across the bypass flowpath and thereby increase bypass flowpath drag and reduce engine efficiency during typical aircraft propulsion system operation; e.g., during aircraft cruise. There is a need in the art therefore for an improved thrust reverser with reduced drag.

SUMMARY OF THE DISCLOSURE

According to an aspect of the present disclosure, an assembly is provided for an aircraft propulsion system. This assembly includes a translating structure and a thrust reverser. The translating structure is configured to translate between a stowed position and a deployed position. The thrust reverser includes a blocker door, an actuation linkage and a fairing. The blocker door is pivotally coupled to the translating structure. The blocker door includes a door surface and a channel that projects into the blocker door from the door surface. The door surface forms an outer peripheral boundary of a flowpath when the translating structure is in the stowed position. The door surface projects into the flowpath when the translating structure is in the deployed position. The actuation linkage is pivotally coupled to the blocker door. The actuation linkage is disposed in the channel when the translating structure is in the stowed position. The fairing projects away from the door surface into the flowpath. The fairing forms an aerodynamic cover over the channel when the translating structure is in the stowed position.

According to another aspect of the present disclosure, another assembly is provided for an aircraft propulsion system. This assembly includes a fixed structure, a translating structure and a thrust reverser. The translating structure is configured to translate relative to the fixed structure between a stowed position and a deployed position. The thrust reverser includes a blocker door, a structure link and a door link. The blocker door is pivotally coupled to the translating structure and includes a door surface. The door surface forms an outer peripheral boundary of a flowpath when the translating structure is in the stowed position. The door surface projects into the flowpath when the translating structure is in the deployed position. The structure link is pivotally coupled to the fixed structure. The structure link includes a fairing that projects into the flowpath from the door surface when the translating structure is in the stowed position. The door link extends between and is pivotally coupled to the structure link and the blocker door. The door link is nested within and covered by the fairing when the translating structure is in the stowed position.

According to another aspect of the present disclosure, another assembly is provided for an aircraft propulsion system. This assembly includes a translating structure and a thrust reverser. The translating structure is configured to translate between a stowed position and a deployed position. The thrust reverser includes a blocker door, an actuation linkage and a fairing. The blocker door is pivotally coupled to the translating structure. The blocker door includes a door surface and a channel that projects into the blocker door from the door surface. The door surface forms an outer peripheral boundary of a flowpath when the translating structure is in the stowed position. The door surface projects into the flowpath when the translating structure is in the deployed position. The actuation linkage is pivotally coupled to the blocker door. The actuation linkage is disposed in the channel when the translating structure is in the stowed position. The fairing is disposed in the flowpath and covers the channel when the translating structure is in the stowed position. A lateral width of the fairing is greater than a lateral width of the channel.

According to still another aspect of the present disclosure, another assembly is provided for an aircraft propulsion system. This assembly includes a translating structure and a thrust reverser. The translating structure is configured to translate between a stowed position and a deployed position. The thrust reverser includes a blocker door, an actuation linkage and a fairing. The blocker door is pivotally coupled to the translating structure and includes a door surface. The door surface forms an outer peripheral boundary of a flowpath when the translating structure is in the stowed position. The door surface projects into the flowpath when the translating structure is in the deployed position. The actuation linkage is pivotally coupled to the blocker door. The fairing projects out from the door surface into the flowpath. At least a portion of the fairing is fixed with the door surface.

The actuation linkage may be nested within a slot of the fairing when the translating structure is in the stowed position.

A second portion of the fairing may be fixed with the actuation linkage.

The translating structure may be configured to translate axially along an axis between the stowed position and the deployed position. The fairing may project axially out from: an upstream end of the blocker door to an upstream end of the fairing; and/or a downstream end of the blocker door to a downstream end of the fairing.

The structure link may be disposed radially inboard of the door surface when the translating structure is in the stowed position.

The door link may extend through a port in the blocker door.

A lateral width of the fairing may be greater than a lateral width of the channel.

The fairing may laterally overlap a portion of the door surface adjacent the channel.

When the translating structure is in the stowed position, the fairing may taper in a direction towards the door surface as the fairing extends longitudinally to an upstream end of the fairing.

When the translating structure is in the stowed position, the fairing may taper in a direction towards the door surface as the fairing extends longitudinally to a downstream end of the fairing.

When the translating structure is in the stowed position, the fairing may project longitudinally out from an upstream end of the blocker door.

When the translating structure is in the stowed position, the fairing may project longitudinally out from a downstream end of the blocker door.

At least a portion of the fairing may be configured as part of the blocker door.

At least a portion of the fairing may be configured as part of the actuation linkage.

The assembly may also include a fixed structure. The actuation linkage may operatively couple the blocker door to the fixed structure.

The actuation linkage may include a structure link and a door link. The structure link may be pivotally coupled to the fixed structure. The door link may extend between and may be pivotally coupled to the structure link and the blocker door.

At least a portion of the fairing may be configured as part of the structure link.

At least a portion of the fairing may be configured as part of the door link.

The door link may be configured as or otherwise include a crank arm.

The assembly may also include a fixed cascade structure projecting into an internal cavity of the translating structure when the translating structure is in the stowed position.

The present disclosure may include any one or more of the individual features disclosed above and/or below alone or in any combination thereof.

The foregoing features and the operation of the invention will become more apparent in light of the following description and the accompanying drawings.

BRIEF DESCRIPTION OF THE DRAWINGS

FIG. 1 is a schematic illustration of an aircraft propulsion system with a thrust reverser in a stowed position.

FIG. 2 is a schematic illustration of the aircraft propulsion system with the thrust reverser in a deployed position.

FIGS. 6A-H illustrate a sequence of the thrust reverser moving from a stowed arrangement to a deployed arrangement.

FIG. 8 is a perspective illustration of a portion of the thrust reverser with its blocker doors stowed, where each blocker door is arranged with a fairing.

FIG. 9 is a perspective illustration of a portion of the thrust reverser of FIG. 8.

FIGS. 10 and 11 are partial cross-sectional illustrations of a stowed blocker door assembly with various fairing arrangements.

FIGS. 12A and 12B are partial cross-sectional illustrations of a stowed blocker door assembly with at least a portion of its fairing configured with its structure link.

DETAILED DESCRIPTION

Figure 3:
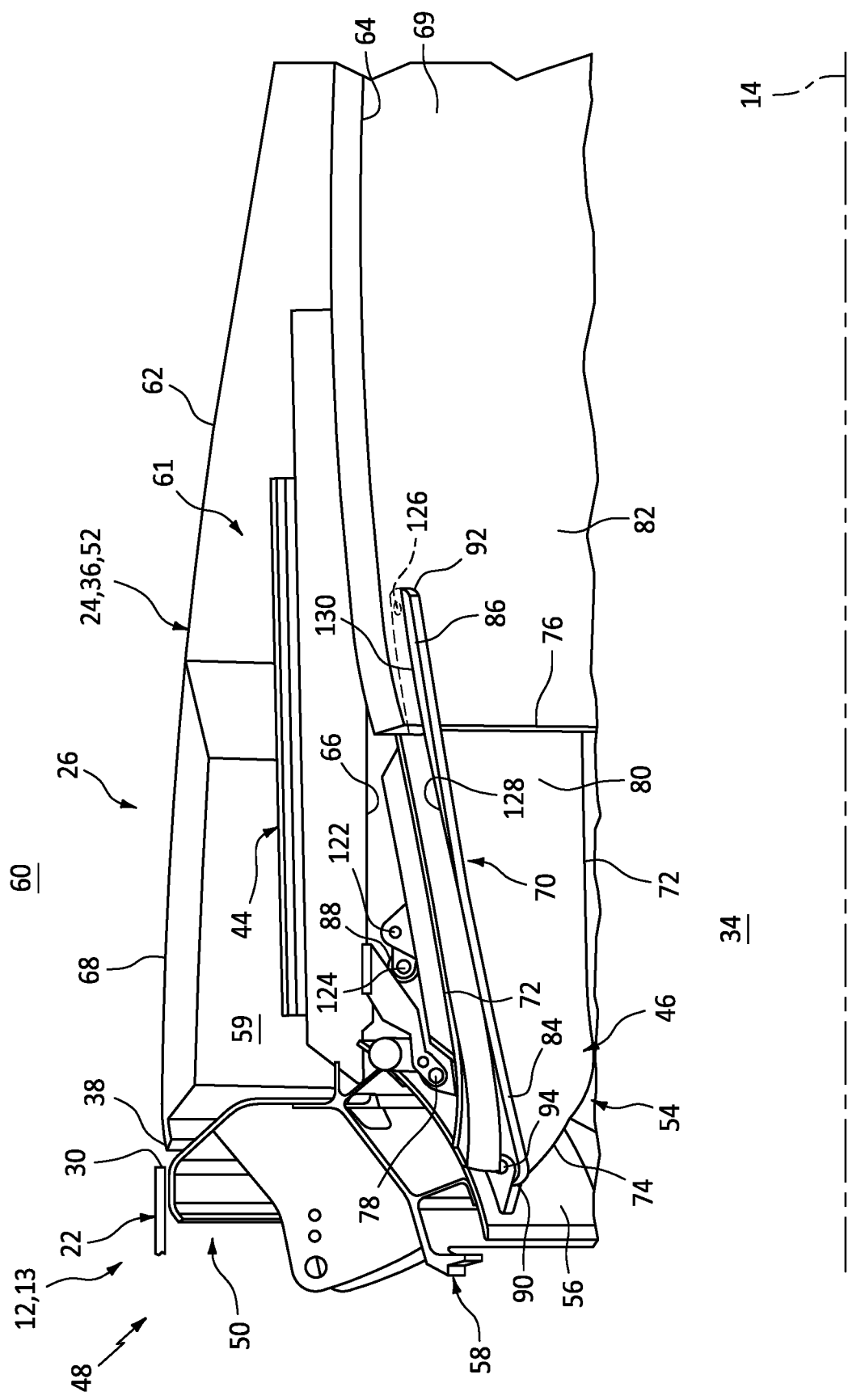
FIG. 3 is a side-sectional illustration of an aft portion of the aircraft propulsion system in FIG. 1.

FIG. 1 illustrates an aircraft propulsion system 10 for an aircraft. The aircraft may be an airplane, a drone (e.g., an unmanned aerial vehicle (UAV)) or any other manned or unmanned aerial vehicle or system. The aircraft propulsion system 10 includes a gas turbine engine and a nacelle 12.

The gas turbine engine is configured to power operation of the aircraft propulsion system 10. The gas turbine engine is also configured to produce thrust to propel the aircraft during flight. For ease of description, the gas turbine engine is generally described below as a turbofan engine such as a high-bypass turbofan engine. The present disclosure, however, is not limited to such an exemplary gas turbine engine. Moreover, while the aircraft propulsion system 10 is described as including the gas turbine engine to power operation and produce thrust, it is contemplated the gas turbine engine may be replaced by (or augmented with) one or more propulsor rotors (e.g., fan rotors and/or other air movers) driven by a hybrid-electric power unit or a fully electric power unit.

The nacelle 12 is configured to house and provide an aerodynamic cover for the gas turbine engine. An outer structure 13 of the nacelle 12 extends along an axial centerline 14 from a forward end 16 of the nacelle 12 and its outer structure 13 to an aft end 18 of the nacelle outer structure 13. The nacelle outer structure 13 of FIG. 1 includes an inlet structure 20, one or more fan cowls 22 (one such fan cowl visible in FIG. 1) and an aft structure 24, which aft structure 24 is configured as part of or otherwise includes a thrust reverser 26 (see also FIG. 2).

The inlet structure 20 is disposed at the nacelle forward end 16. The inlet structure 20 is configured to direct a stream of air through an inlet opening 28 at the nacelle forward end 16 and into a fan section of the gas turbine engine.

The fan cowls 22 are disposed axially between the inlet structure 20 and the aft structure 24. Each fan cowl 22 of FIG. 1, for example, is disposed at (e.g., on, adjacent or proximate) an aft end 30 of a stationary portion of the nacelle 12, and extends axially forward to the inlet structure 20. Each fan cowl 22 is generally axially aligned with the fan section of the gas turbine engine. The fan cowls 22 are configured to provide an aerodynamic covering over a fan case 32 for the fan section. Briefly, this fan case 32 circumscribes the fan rotor and may partially form a forward outer peripheral boundary of a bypass flowpath 34 (see FIGS. 3 and 4) of the aircraft propulsion system 10.

The term "stationary portion" is used above to describe a portion of the nacelle 12 that is stationary during aircraft propulsion system operation (e.g., during takeoff, aircraft flight and landing). However, the stationary portion may be otherwise movable for aircraft propulsion system inspection/maintenance; e.g., when the aircraft propulsion system 10 is non-operational. Each of the fan cowls 22, for example, may be configured to provide access to components of the gas turbine engine such as the fan case 32 and/or peripheral equipment configured therewith for inspection, maintenance and/or otherwise. In particular, each fan cowl 22 may be pivotally mounted with the aircraft propulsion system 10 by, for example, a pivoting hinge system. Alternatively, the fan cowls 22 and the inlet structure 20 may be configured into a single axially translatable body for example. The present disclosure, of course, is not limited to the foregoing fan cowl configurations and/or access schemes.

The aft structure 24 includes a translating sleeve 36 for the thrust reverser 26. The translating sleeve 36 of FIG. 1 is disposed at the outer structure aft end 18. This translating sleeve 36 extends axially along the axial centerline 14 between a forward end 38 of the translating sleeve 36 and the outer structure aft end 18. The translating sleeve 36 is configured to partially form an aft outer peripheral boundary of the bypass flowpath 34 (see FIGS. 3 and 4). The translating sleeve 36 may also be configured to form a bypass nozzle 40 for the bypass flowpath 34 with an inner structure 42 of the nacelle 12 (e.g., an inner fixed structure (IFS)), which nacelle inner structure 42 houses a core (e.g., a gas generator) of the gas turbine engine.

The translating sleeve 36 of FIG. 1 includes a pair of sleeve segments 43 (e.g., halves) arranged on opposing sides of the aircraft propulsion system 10 (one such sleeve segment visible in FIG. 1). The present disclosure, however, is not limited to such an exemplary translating sleeve configuration. For example, the translating sleeve 36 may alternatively have a substantially tubular body. For example, the translating sleeve 36 may extend more than three-hundred and thirty degrees (330°) around the axial centerline 14.

Referring to FIGS. 1 and 2, the translating sleeve 36 is an axially translatable structure. Each translating sleeve segment 43, for example, may be slidably connected to one or more stationary structures (e.g., a pylon and a lower bifurcation) through one or more respective track assemblies. Each track assembly may include a rail mated with a track beam; however, the present disclosure is not limited to the foregoing exemplary sliding connection configuration.

With the foregoing configuration, the translating sleeve 36 may translate axially along the axial centerline 14 and relative to the stationary portion. The translating sleeve 36 may thereby move axially between a forward stowed position (e.g., see FIG. 1) and an aft deployed position (e.g., see FIG. 2). In the sleeve stowed position, the translating sleeve 36 provides the functionality described above. In the sleeve deployed position, the translating sleeve 36 at least partially (or substantially completely) uncovers at least one or more other components of the thrust reverser 26 such as, but not limited to, a fixed cascade structure 44. In addition, as the translating sleeve 36 moves from the sleeve stowed position to the sleeve deployed position, one or more blocker doors 46 arranged with the translating sleeve 36 of FIGS. 3 and 4 may be deployed from their stowed position (e.g., see FIG. 3) to their deployed position (e.g., see FIG. 4) to divert bypass air from the bypass flowpath 34 and through the cascade structure 44 to provide reverse thrust.

Figure 4:
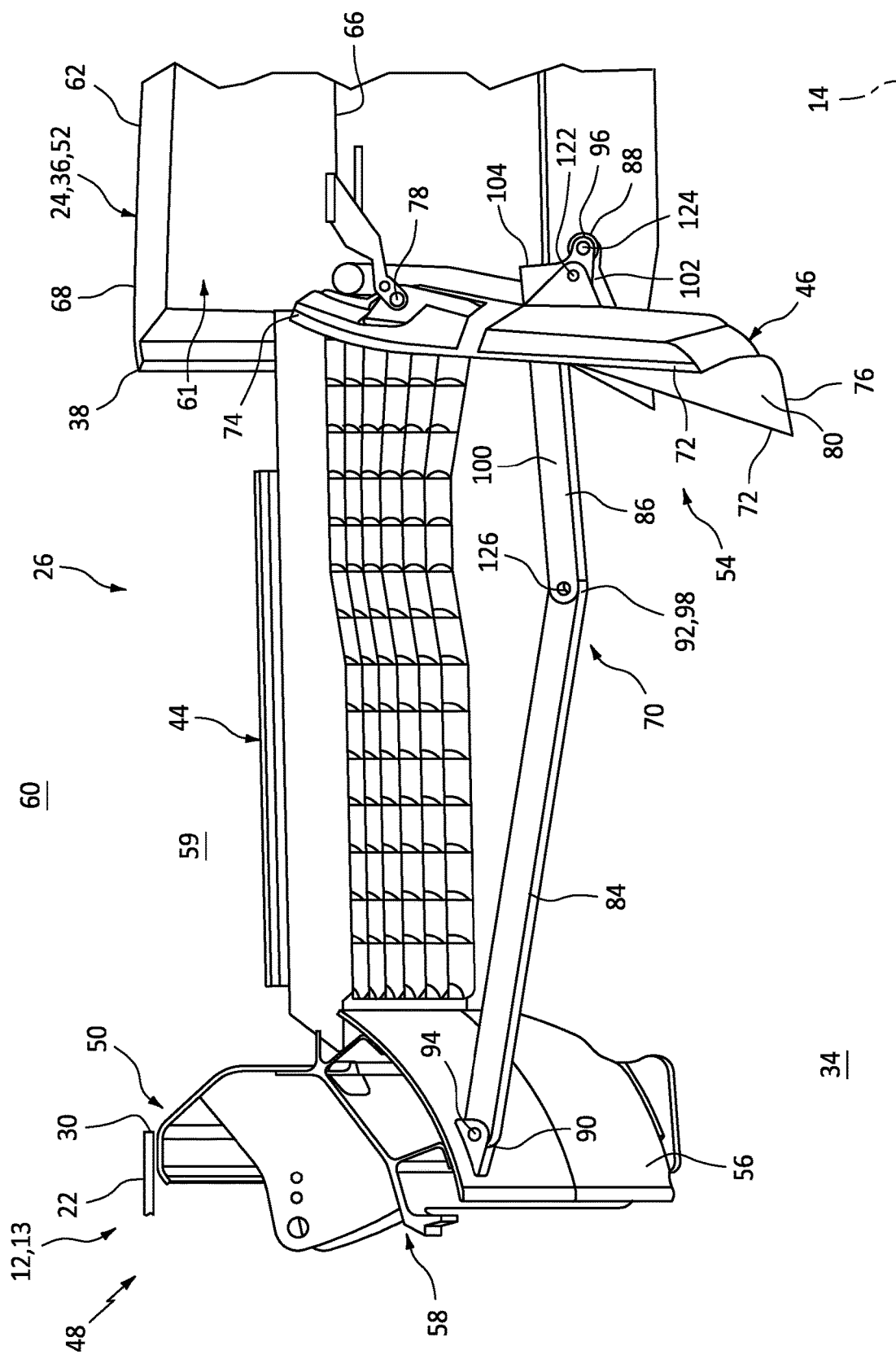
FIG. 4 is a side-sectional illustration of the aft portion of the aircraft propulsion system in FIG. 2.

FIG. 3 is a partial side sectional illustration of an assembly 48 for the aircraft propulsion system 10 with the thrust reverser 26 in a stowed arrangement. FIG. 4 is a partial side sectional illustration of the assembly 48 with the thrust reverser 26 in a deployed arrangement. This assembly 48 of FIGS. 3 and 4 includes a nacelle fixed structure 50, a nacelle translating structure 52 and a thrust reverser blocker door assembly 54.

The fixed structure 50 is located at the aft end 30 of the stationary portion of the nacelle outer structure 13. Referring to FIG. 4, the fixed structure 50 includes a bullnose 56 and an internal nacelle support structure 58; e.g., a torque box.

The bullnose 56 is configured to provide a smooth aerodynamic transition from the bypass flowpath 34 to a thrust reverser passage 59. This thrust reverser passage 59 is opened (e.g., uncovered, formed, etc.) when the thrust reverser 26 is in its deployed arrangement. The thrust reverser passage 59 is bounded axially by and extends axially within the nacelle outer structure 13 between the nacelle support structure 58 and the translating structure 52. The thrust reverser passage 59 extends radially through the nacelle outer structure 13 and across the cascade structure 44 from the bypass flowpath 34 to an environment 60 external to the aircraft propulsion system 10 and its nacelle 12.

The nacelle support structure 58 extends circumferentially about (e.g., circumscribes) and supports the bullnose 56. The nacelle support structure 58 also provides a base to which the cascade structure 44 may be (e.g., fixedly) mounted. The cascade structure 44 may thereby project axially aft from the nacelle support structure 58. With such a configuration, when the translating structure 52 is in the stowed position of FIG. 3, the cascade structure 44 may be located within an internal cavity 61 of the translating structure 52. When the translating structure 52 is in the deployed position of FIG. 4, the cascade structure 44 is uncovered and located within the thrust reverser passage 59.

The translating structure 52 is configured as or otherwise includes the translating sleeve 36. The translating sleeve 36 of FIGS. 3 and 4 includes an outer panel 62, an inner panel 64 and an internal support structure 66. The outer panel 62 is configured to form a portion of an outer aerodynamic surface 68 of the nacelle 12 adjacent the bypass nozzle 40 (see FIG. 1). A radial inner surface 69 of the inner panel 64 is configured to form the outer peripheral boundary of the bypass flowpath 34 adjacent the bypass nozzle 40 (see FIG. 1). The internal support structure 66 is positioned radially between the outer panel 62 and the inner panel 64. The internal support structure 66 is disposed with the internal cavity 61. The internal cavity 61 is radially located between and may be formed by the outer panel 62 and the inner panel 64. The internal cavity 61 projects axially aft partially into the translating sleeve 36 from its forward end 38.

Referring to FIG. 4, the blocker door assembly 54 includes the one or more blocker doors 46 (one visible in FIG. 4) arranged circumferentially about the axial centerline 14. The blocker door assembly 54 also includes at least (or only) one door actuation linkage 70 associated with each blocker door 46.

Each blocker door 46 extends laterally between opposing lateral sides 72 of the respective blocker door 46. Here, the lateral direction may be a circumferential direction about the axial centerline 14 when the respective blocker door 46 is in its door stowed position of FIG. 3. Each blocker door 46 extends longitudinally from a longitudinal first end 74 of the respective blocker door 46 to a longitudinal second end 76 of the respective blocker door 46. Here, the longitudinal direction may be a substantially axial direction along the axial centerline 14 when the respective blocker door 46 is in its door stowed position of FIG. 3, and a substantially radial direction relative to the axial centerline 14 when the respective blocker door 46 is in its door deployed position of FIG. 4. The door first end 74 may thereby be an axial upstream, forward end of the respective blocker door 46 when that blocker door 46 is in its stowed position of FIG. 3, and a radial outer end of the respective blocker door 46 when that blocker door 46 is in its deployed position of FIG. 4. Similarly, the door second end 76 may be an axial downstream, aft end of the respective blocker door 46 when that blocker door 46 is in its stowed position of FIG. 3, and a radial inner end of the respective blocker door 46 when that blocker door 46 is in its deployed position of FIG. 4.

Referring to FIGS. 3 and 4, each blocker door 46 is pivotally coupled to the translating sleeve 36. Each blocker door 46 of FIGS. 3 and 4, for example, is pivotally attached to the internal support structure 66 at one or more door pivot joints 78 (one joint visible in FIGS. 3 and 4); e.g., via one or more hinges fixed to the internal support structure 66. These door pivot joints 78 may be located at or near the opposing door sides 72. The door pivot joints 78 may also be located at or near the door first end 74. With this arrangement, each blocker door 46 is configured to move (e.g., pivot) radially inwards into the bypass flowpath 34 from its door stowed position of FIG. 3 to its door deployed position of FIG. 4. In the stowed position of FIG. 3, each blocker door 46 may be mated with (e.g., nested in) a respective pocket in the translating sleeve 36 and its inner panel 64. Here, a side door surface 80 (e.g., a concave, arcuate radial inner surface) of each blocker door 46 of FIG. 3 may be arranged substantially flush with the inner panel inner surface 69. Each blocker door 46 and its door surface 80 may thereby also form a respective outer peripheral boundary of the bypass flowpath 34 when stowed. By contrast, in the deployed position of FIG. 4, each blocker door 46 and its door surface 80 projects radially inward towards the axial centerline 14 (see FIG. 4) from the translating sleeve 36 and radially into the bypass flowpath 34. Each blocker door 46 and its door surface 80 may thereby partially block passage to the bypass nozzle 40 (see FIG. 1) when deployed.

Each door actuation linkage 70 may be configured as a folding linkage such as a bi-folding linkage; e.g., a scissor linkage. The door actuation linkage 70 of FIG. 4, for example, includes a rigid, unitary structure link 84 and a rigid, unitary door link 86. This door actuation linkage 70 of FIG. 4 may also include a door guide. For ease of description, the door guide is described below as a roller 88. The door guide, however, may alternatively be configured as a slider, a moveable carriage, a track and guide assembly, or the like.

The structure link 84 may be configured as a strut; e.g., a single, fixed length strut. The structure link 84 of FIG. 4 extends longitudinally from a longitudinal first end 90 of the structure link 84 to a longitudinal second end 92 of the structure link 84. Here, the longitudinal direction may be a substantially axial direction along the axial centerline 14 when the respective blocker door 46 is in its door stowed position of FIG. 3. The structure link first end 90 of FIG. 3 is thereby an axial forward end of the structure link 84 when the respective blocker door 46 is in its stowed position. The structure link second end 92 of FIG. 3 is an axial aft end of the structure link 84 when the respective blocker door 46 is in its stowed position.

Referring to FIG. 4, the structure link 84 is pivotally coupled to the fixed structure 50 at its structure link first end 90. Each structure link 84 of FIG. 4, for example, is pivotally attached to the fixed structure 50 at a structure link pivot joint 94; e.g., via a hinge or a clevis connection fixed to the fixed structure 50 and projecting out from the bullnose 56.

Figure 5:
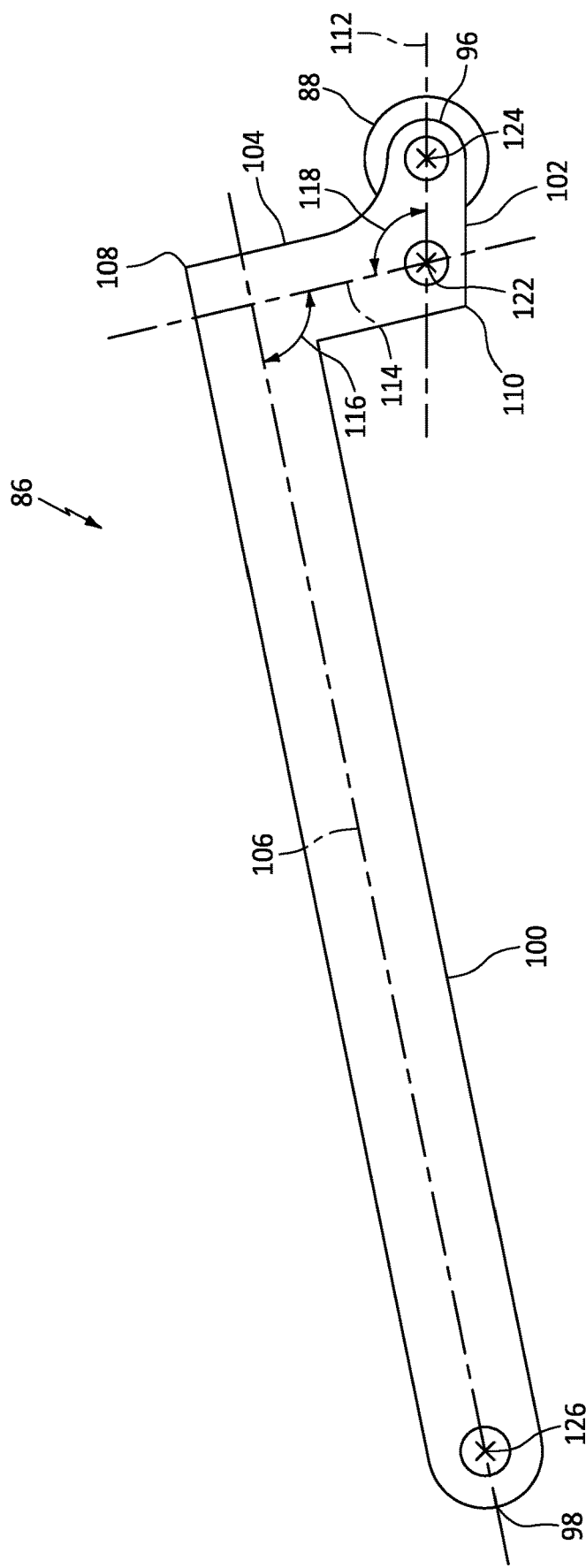
FIG. 5 is a plan view illustration of a door link.

Referring to FIG. 5, the door link 86 may be configured as a crank; e.g., a single, fixed length crank. The door link 86 of FIG. 5 extends longitudinally from a longitudinal first end 96 of the door link 86 to a longitudinal second end 98 of the door link 86. The door link 86 of FIG. 5 includes a first lever section 100 (e.g., crank arm), a second lever section 102 (e.g., crank arm) and an offset section 104. The first lever section 100 extends along a (e.g., straight line or slightly curved) first lever section trajectory 106 from the door link second end 98 to a first elbow 108 where the first lever section 100 meets and is connected to (e.g., formed integral with) a first end of the offset section 104. The second lever section 102 extends along a (e.g., straight line or slightly curved) second lever section trajectory 112 from the door link first end 96 to a second elbow 110 where the second lever section 102 meets and is connected to (e.g., formed integral with) a second end of the offset section 104. This second lever section trajectory 112 may be parallel with or (e.g., slightly) angularly offset from the first lever section trajectory 106. The offset section 104 extends along a (e.g., straight line or slightly curved) offset section trajectory 114 from the first elbow 108 to the second elbow 110. The offset section trajectory 114 is angularly offset from the first lever section trajectory 106 at the first elbow 108 by a first offset angle 116. The offset section trajectory 114 is angularly offset from the second lever section trajectory 112 at the second elbow 110 by a second offset angle 118, which second offset angle 118 may be equal to or different than the first offset angle 116. Each offset angle 116, 118 of FIG. 5 is between eighty degrees (80°) and one-hundred degrees (100°); e.g., ninety degrees (90°). The present disclosure, however, is not limited to such exemplary offset angles and may vary depending upon the specific thrust reverser arrangement.

Referring to FIG. 4, the door link 86 is pivotally coupled to the respective blocker door 46 at (or near) its door link first end 96. The door link 86 of FIG. 4, for example, is pivotally attached to the respective blocker door 46 at a door link pivot joint 122; e.g., via a hinge or a clevis connection fixed to the respective blocker door 46. The door link pivot joint 122 of FIG. 5 is located at the second elbow 110 and may be disposed at a longitudinal intermediate location (e.g., approximately centered) between the door first end 74 and the door second end 76. Referring to FIG. 3, the door link pivot joint 122 may also be located radially outboard (e.g., radially outside) of the blocker door surface 80 when the respective blocker door 46 stowed. Referring to FIG. 5, the roller 88 is rotatably connected to the door link 86 and its second lever section 102 at the door link first end 96; e.g., via a roller joint 124.

The door link 86 of FIG. 4 and its first lever section 100 project through an aperture (e.g., a port) in the respective blocker door 46 from the offset section 104 to the door link second end 98. The door link 86 is pivotally coupled to the structure link 84. The door link 86 of FIG. 4, for example, is pivotally attached to the structure link 84 via an interlink pivot joint 126; e.g., via a hinge or a clevis connection. The door link 86 of FIG. 4 thereby operatively couples the respective blocker door 46 to the structure link 84. The structure link 84 operatively couples the fixed structure 50 to the door link 86.

Figure 6E:
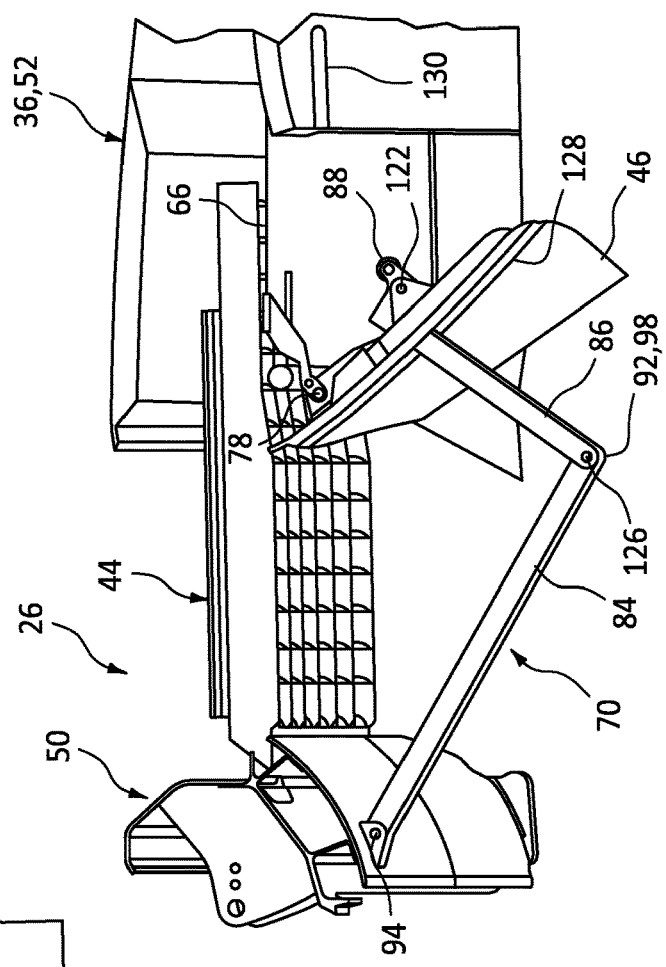
Figure 6F:
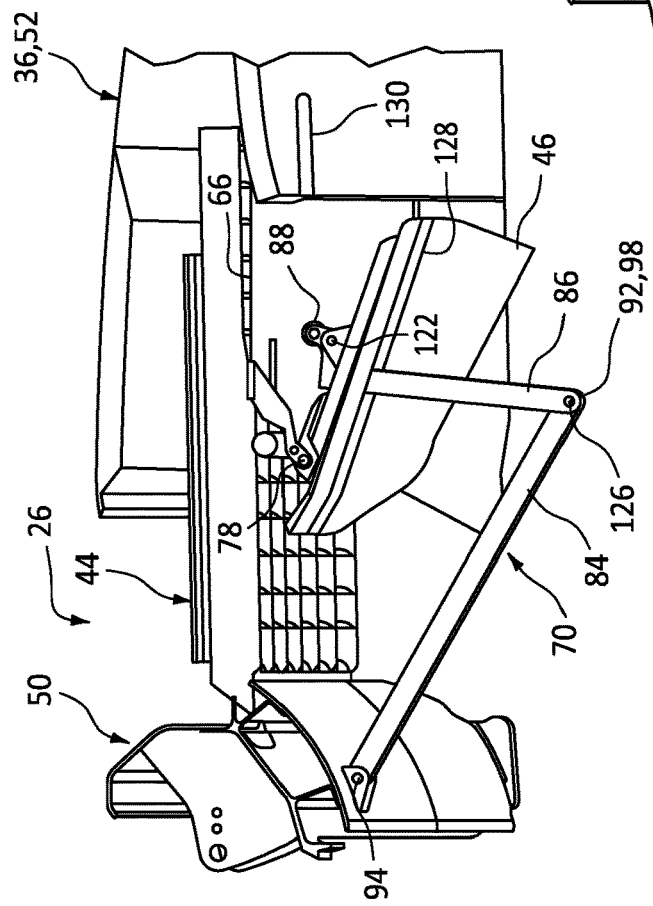

FIGS. 6A-H illustrate a sequence of the thrust reverser 26 deploying, where the translating sleeve 36 is in its stowed position in FIG. 6A and is in its deployed position in FIG. 6H. In the stowed arrangement of FIG. 6A, each blocker door 46 is nested within its respective pocket in the translating sleeve 36. In addition, each door actuation linkage 70 is folded and each door actuation linkage 70 and its members 84 and 86 are nested in a door channel 128 (see FIG. 7) in the respective blocker door 46 and a sleeve channel 130 in the translating sleeve 36. Moreover, referring to FIG. 7, each structure link 84 may be nested within the door link 86. With this arrangement, each door actuation linkage 70 and its members 84 and 86 may be tucked away and at least partially out of the bypass flowpath 34 when the thrust reverser 26 is not being used. However, the structure link 84 and/or the door link 86 may still border and may be exposed to the bypass flowpath 34. By contrast, a drag link of a typical prior art thrust reverser extends across a bypass duct even when the thrust reverser is not being used, which increases drag and, thus, reduces engine efficiency during nominal operation.

During deployment from FIG. 6A to FIG. 6H, movement of each blocker door 46 is actuated by axial movement of the translating structure 52 and its translating sleeve 36. In particular, as the translating sleeve 36 moves axially aft from its stowed position towards the deployed position, the translating sleeve 36 pulls the blocker doors 46 aft. To compensate for the increased axial distance between the blocker doors 46 and the fixed structure 50, each door actuation linkage 70 begins to unfold. More particularly, the structure link second end 92 pivots about the structure link pivot joint 94 and moves radially inward. The door link second end 98 correspondingly pivots about the door link pivot joint 122 and moves radially inward. This pivoting of the door link 86, in turn, causes the door link first end 96 to also pivot about the door link pivot joint 122. Each roller 88 simultaneously pushes radially against the internal support structure 66, which causes the door link pivot joint 122 and, thus, the respective blocker door 46 to move radially inward and away from the internal support structure 66. More particularly, the engagement of each roller 88 against the internal support structure 66 causes the door link second end 98 to pivot about the door link pivot joint 122 and move radially inward. Each door actuation linkage 70 of FIGS. 6A-H is thereby configured to initiate movement (e.g., pivoting) of the respective blocker door 46 substantially simultaneously (e.g., +/−time associated with standard industry engineering tolerances) with the initiation of the aft translation of the translating sleeve 36 from the sleeve stowed position towards the sleeve deployed position. In other words, the elements 36 and 46 are configured to begin moving at the same time.

Each roller 88 continues to cause the respective blocker door 46 to pivot inward until the door link 86 reaches and engages a respective stop (e.g., bumper 132 of FIG. 7) configured into the respective blocker door 46 associated with an intermediate position of the translating sleeve 36; e.g., see FIG. 6D. Once the door link 86 reaches and engages its stop (e.g., see bumper 132 of FIG. 7), the door link 86 no longer moves relative to the respective blocker door 46 as shown in FIGS. 6E-H. Rather, the door link 86 functions as a fixed member of the respective blocker door 46. The door link 86 thereby pivots the respective blocker door 46 radially inwards into the bypass flowpath 34 without moving relative to that blocker door 46.

It is worth noting, referring to FIG. 3, each door pivot joint 78 may be located radially inward of a respective door link pivot joint 122 when the thrust reverser 26 and its elements are stowed. This configuration can be implemented because the door link 86 and its associated roller 88 may push the respective door actuation linkage 70 radially inward as described above and, thereby, prevent the door actuation linkage 70 from binding.

While the arrangement of FIG. 3 has significantly less drag and inefficiencies than a drag link of a typical prior art thrust reverser, edges of the channels 128 and 130 and/or edges of the door actuation linkage 70 and its members 84 and 86 may still disrupt airflow through the bypass flowpath 34 even when the thrust reverser 26 is in its stowed arrangement. Therefore, in an effort to further reduce flow disruptions, each blocker door 46 and its respective door actuation linkage 70 may be configured with a fairing 132 as shown in FIGS. 8 and 9. This fairing 132 may be configured as or otherwise include a cover and/or a ramp designed to reduce flow disruptions along the door actuation linkage 70 (see FIGS. 3 and 7) when stowed. The fairing 132 of FIGS. 8 and 9, for example, may form an aerodynamic cover over a respective door channel 128 and/or sleeve channel 130 (see FIGS. 3 and 7) when the door actuation linkage 70 is stowed. In addition to covering the thrust reverser elements 70, 84, 86, 128, 130 (see FIGS. 3 and 7), the fairing 132 may also facilitate alternatively door actuation linkage configurations which otherwise project radially into and/or deeper radially into the bypass flowpath 34 when stowed.

The fairing 132 of FIG. 8 extends longitudinally from a first end 134 of the fairing 132 to a second end 136 of the fairing 132. Here, the longitudinal direction may be a substantially axial direction along the axial centerline when the respective blocker door 46 is in its door stowed position of FIG. 8. The fairing first end 134 of FIG. 8 is thereby an axial forward end of the fairing 132 when the respective blocker door 46 is in its stowed position. Here, the fairing 132 projects longitudinally out from the door first end 74 to its fairing first end 134 when the respective blocker door 46 is stowed. The fairing second end 136 of FIG. 8 is an axial aft end of the fairing 132 when the respective blocker door 46 is in its stowed position. Here, the fairing 132 projects longitudinally out from the door second end 76 to its fairing second end 136 when the respective blocker door 46 is stowed. A longitudinal length of the fairing 132 is thereby longer than a longitudinal length of the respective blocker door 46. The longitudinal length of the fairing 132 may be selected such that the fairing 132 (e.g., completely) longitudinally covers the respective door actuation linkage 70 and/or the respective door channel 128 (see FIG. 7). The longitudinal length of the fairing 132 may also be selected such that the fairing 132 (e.g., partially or completely) longitudinally covers the respective sleeve channel 130 (see FIG. 7), or alternatively omits the need for a sleeve channel in the respective blocker door 46.

The fairing 132 of FIGS. 8 and 9 extend laterally between opposing lateral sides 138 of the fairing 132. Here, the lateral direction may be a circumferential or tangential direction about the axial centerline when the respective blocker door 46 is in its door stowed position of FIG. 8. In some embodiments, referring to FIG. 10, each fairing side 138 may be laterally aligned with (or slightly recessed inward from) a respective one of the door channel sides 140. A lateral width of the fairing 132, for example, may be equal to (or slightly less than) a lateral width of the door channel 128. In other embodiments, referring to FIG. 11, each fairing side 138 may be laterally offset outward from a respective one of the door channel sides 140. The lateral width of the fairing 132, for example, may be greater than the lateral width of the door channel 128. With embodiments of FIGS. 10 and 11, the fairing 132 may (e.g., completely) laterally cover the respective door actuation linkage 70 and/or the respective door channel 128 (see FIG. 7).

The fairing 132 of FIGS. 8 and 9 projects radially inward (towards the axial centerline) away from the respective blocker door 46 and partially into the bypass flowpath 34. More particularly, the fairing 132 of FIGS. 8 and 9 projects radially inward from the respective door surface 80 to a radial inner distal end 142 of the fairing 132. Although the fairing 132 projects partially into the bypass flowpath 34, the fairing 132 is configured to minimize flow disruption within the bypass flowpath 34. The fairing 132 of FIG. 8, for example, radially tapers (in a radial outward direction towards the respective blocker door 46 and its door surface 80) as the fairing 132 extends longitudinally to its fairing first end 134. Here, a ratio of a radial rise to a longitudinal run of the fairing first end taper may be equal to or greater than 1:1, 1:2 or even 1:3. Similarly, the fairing 132 of FIG. 8 radially tapers (in the radial outward direction towards the respective blocker door 46 and its door surface 80) as the fairing 132 extends longitudinally to its fairing second end 136. Here, a ratio of a radial rise to a longitudinal run of the fairing second end taper may be equal to or greater than 1:1, 1:2 or even 1:3. In addition, referring to FIG. 9, the fairing 132 may also laterally taper to its distal end 142; e.g., the fairing 132 may have a rounded, bullnosed or otherwise cased cross-sectional geometry at the fairing distal end 142.

In some embodiments, referring to FIGS. 12A and 12B, at least a portion or an entirety of the fairing 132 may be configured with the door actuation linkage 70 and, more particularly, its structure link 84. For example, referring to FIG. 12A, the fairing 132 may be fixedly attached to or otherwise formed integrally with the structure link 84. In another example, referring to FIG. 12B, the structure link 84 may be reconfigured to extend (e.g., partially or completely) outside of the door channel 128 and form the fairing 132.

Figure 13A:
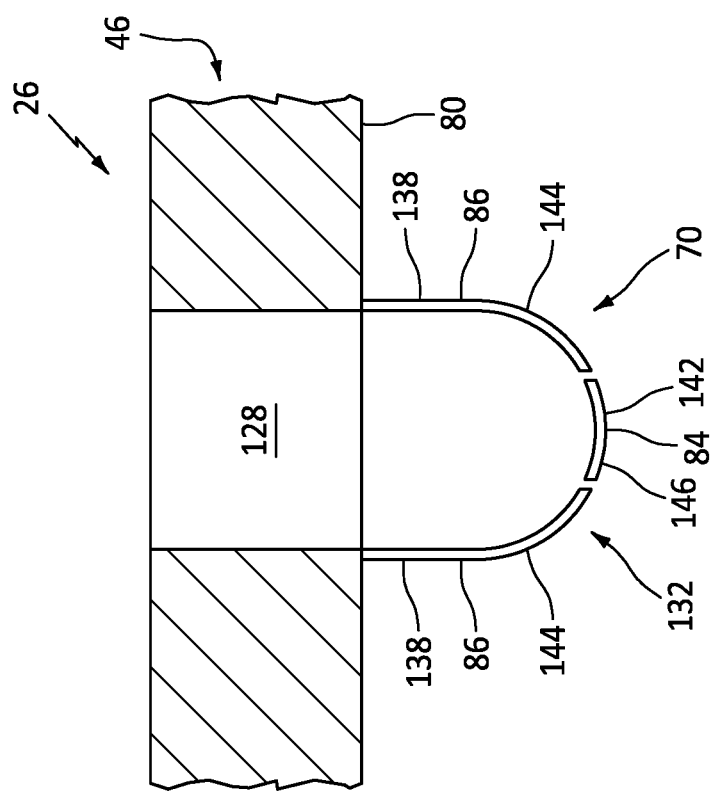
FIGS. 13A and 13B are partial cross-sectional illustrations of a stowed blocker door assembly with at least a portion of its fairing configured with its door link.
Figure 13B:
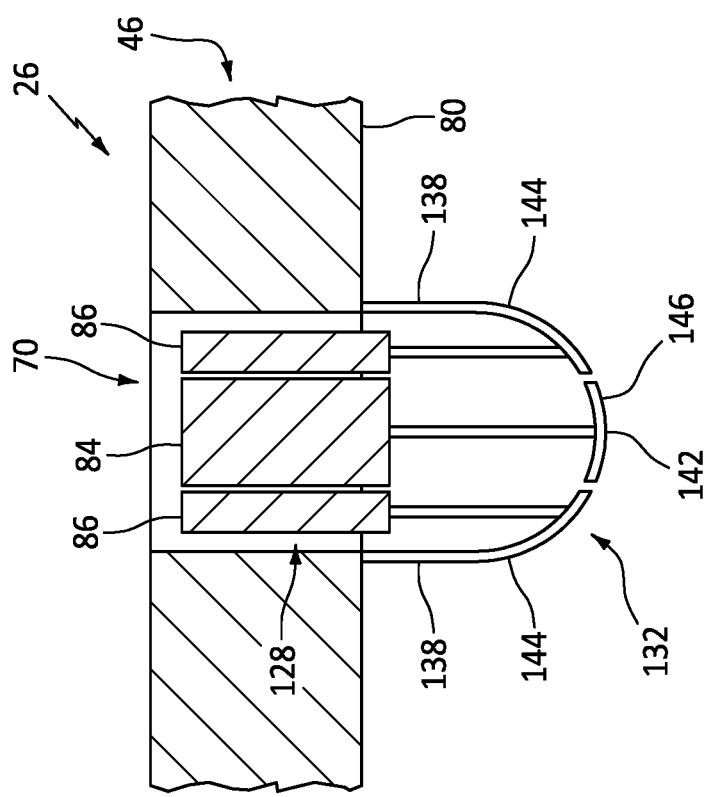

In some embodiments, referring to FIGS. 13A and 13B, at least a portion of the fairing 132 may be configured with the door link 86. For example, the door link 86 may be configured with lateral side portions 144 of the fairing 132 and the structure link 84 may be configured with a lateral center portion 146 of the fairing 132 which bridges a lateral gap between the side portions 144 of the fairing 132. Referring to FIG. 13A, the side portions 144 of the fairing 132 may be fixedly attached to or otherwise integrally formed with the door link 86. Referring to FIG. 13B, the door link 86 may alternatively be reconfigured to extend (e.g., partially or completely) outside of the door channel 128 and form the side portions 144 of the fairing 132.

Figure 14B:
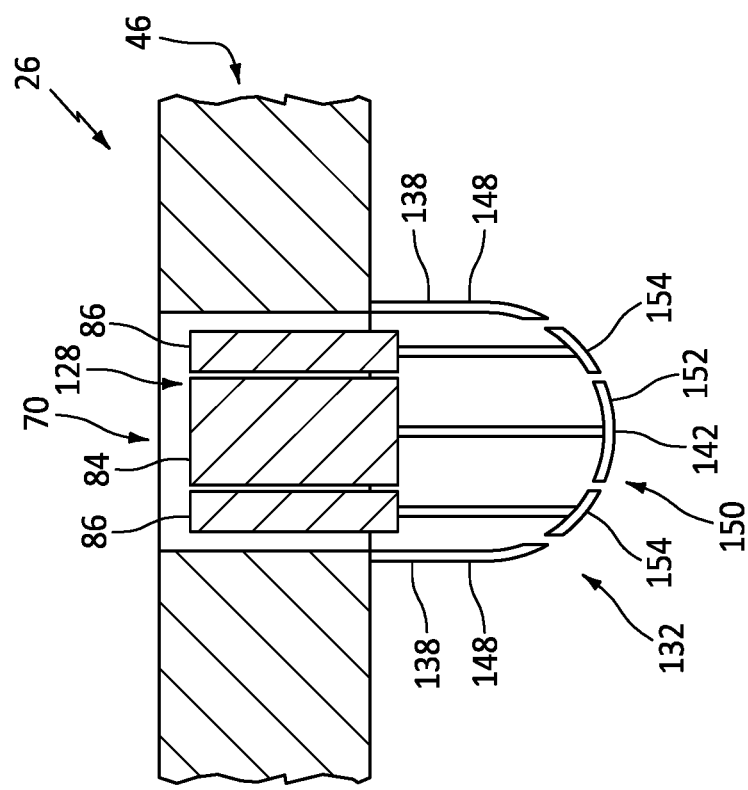
FIGS. 14A and 14B are partial cross-sectional illustrations of a stowed blocker door assembly with at least a portion of its fairing configured with its blocker door.
Figure 14A:
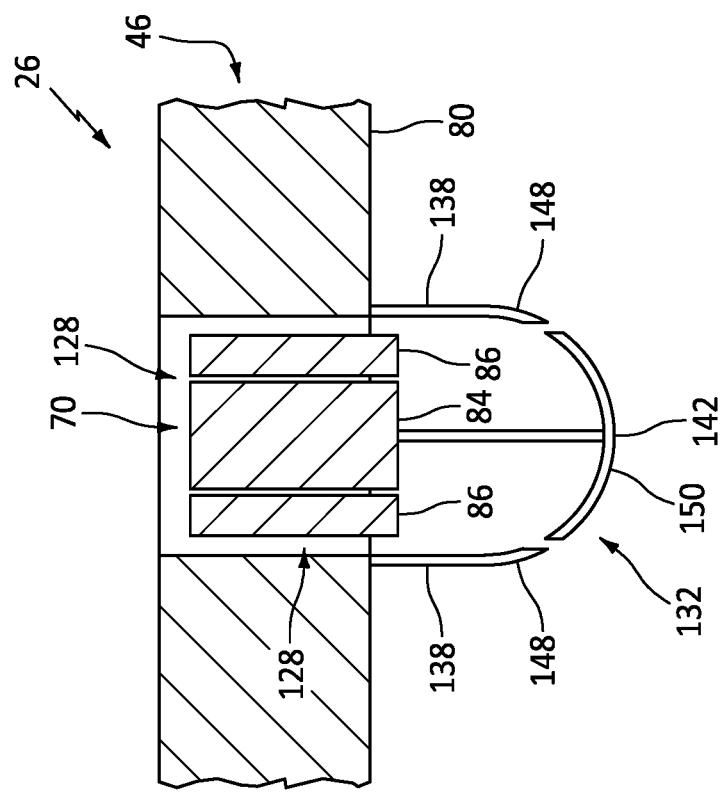

In some embodiments, referring to FIGS. 14A and 14B, at least a portion of the fairing 132 may be configured with the respective blocker door 46. For example, lateral side portions 148 of the fairing 132 may be attached to or otherwise formed integrally with the respective blocker door 46. These lateral side portions 148 of the fairing 132, for example, may be formed as bumps (e.g., protrusions, convexities, etc.) in the door surface 80 laterally adjacent the door channel 128. In some embodiments, referring to FIG. 14A, a lateral center portion 150 of the fairing 132 which bridges a lateral gap between the side portions 148 of the fairing 132 may be formed by the structure link 84. Here, the center portion 150 of the fairing 132 may be configured with the structure link 84 similar to that as described above with respect to FIG. 12A or FIG. 12B. In other embodiments, referring to FIG. 14B, the center portion 150 of the fairing 132 which bridges a lateral gap between the side portions 148 of the fairing 132 may be formed by both the structure link 84 and the door link 86. Here, a respective section 152 of the center portion 150 of the fairing 132 may be configured with the structure link 84 similar to that as described above with respect to FIG. 12A or FIG. 12B. Respective sections 154 of the center portion 150 of the fairing 132 may be configured with the door link 86 similar to that as described above with respect to FIG. 13A or FIG. 13B. The present disclosure, of course, is not limited to the foregoing exemplary fairing arrangements.

Figure 7:
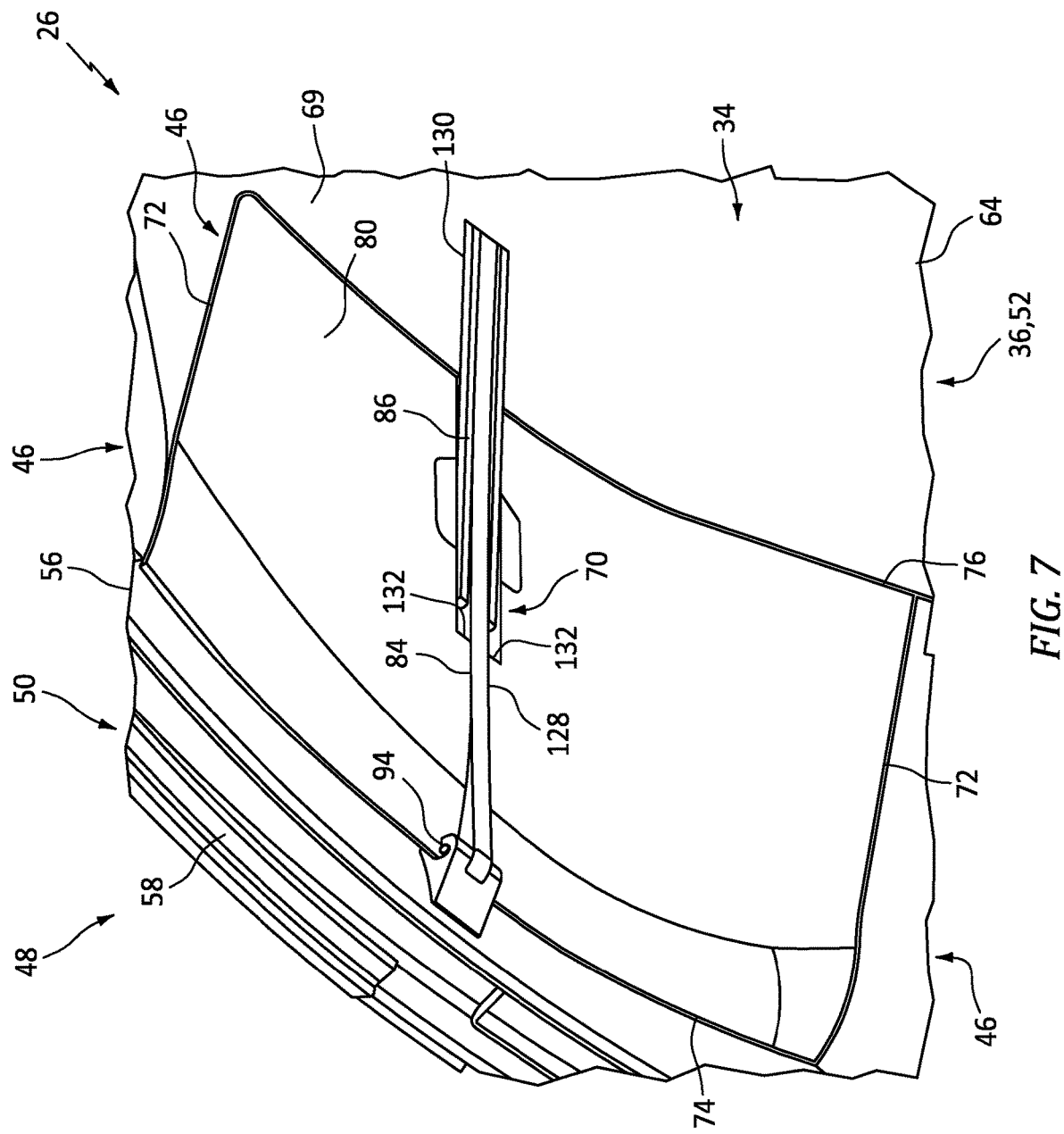
FIG. 7 is a perspective illustration of a portion of the thrust reverser with its blocker doors stowed.
Figure 15:
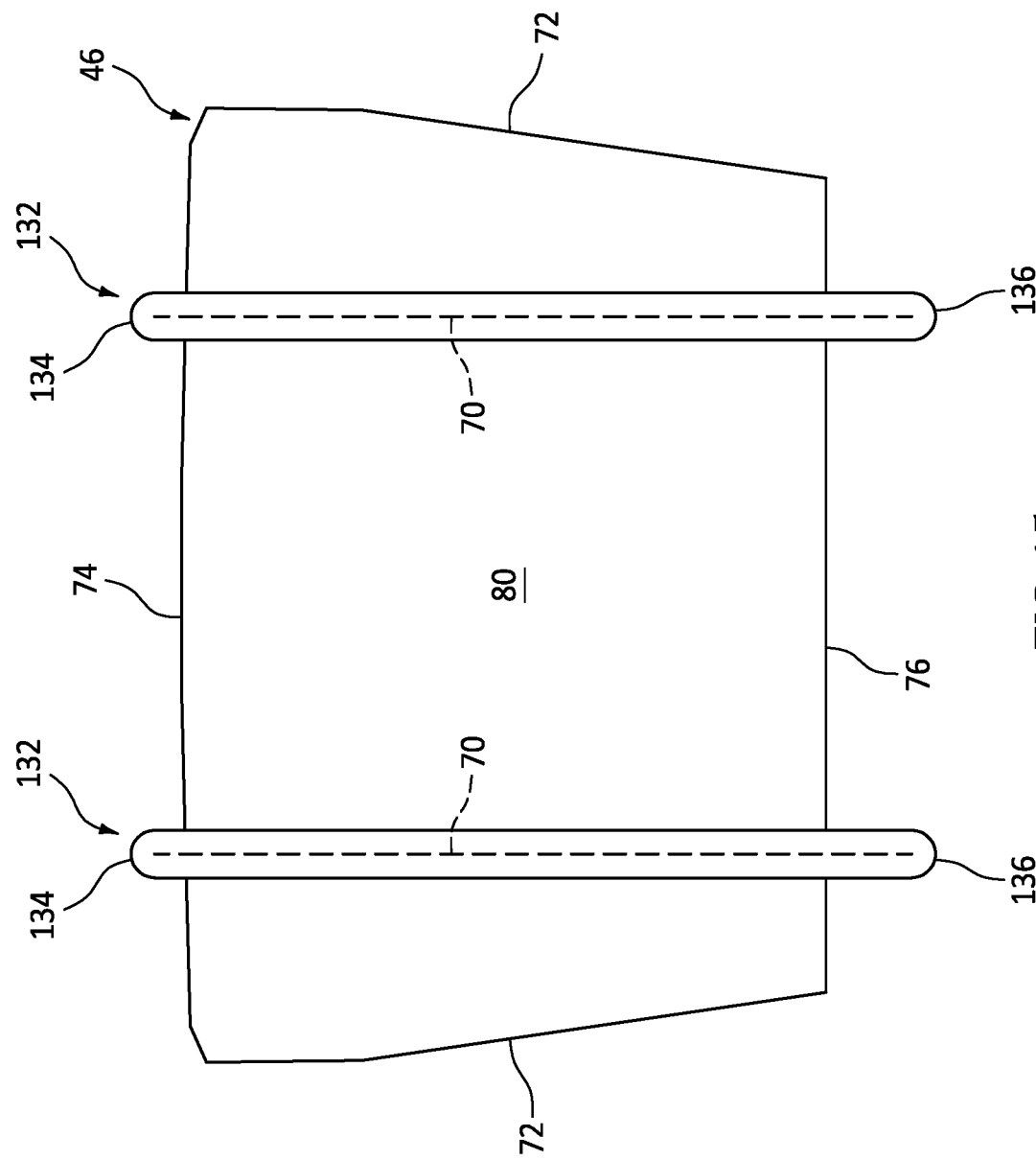
FIG. 15 is a plan view illustration of a stowed blocker door assembly with multiple fairings.

In some embodiments, referring to FIGS. 7 and 8, each door actuation linkage 70 and its members 84 and 86 and the respective fairing 132 may be located at an intermediate position (e.g., laterally centered) between the sides 72 of the respective blocker door 46. With such an arrangement, each blocker door 46 is configured with a single door actuation linkage 70 and a single fairing 132. However, referring to FIG. 15, it is contemplated each blocker door 46 may alternatively be configured with multiple fairings 132, where each fairing 132 is associated with a respective door actuation linkage 70.

Figure 16:
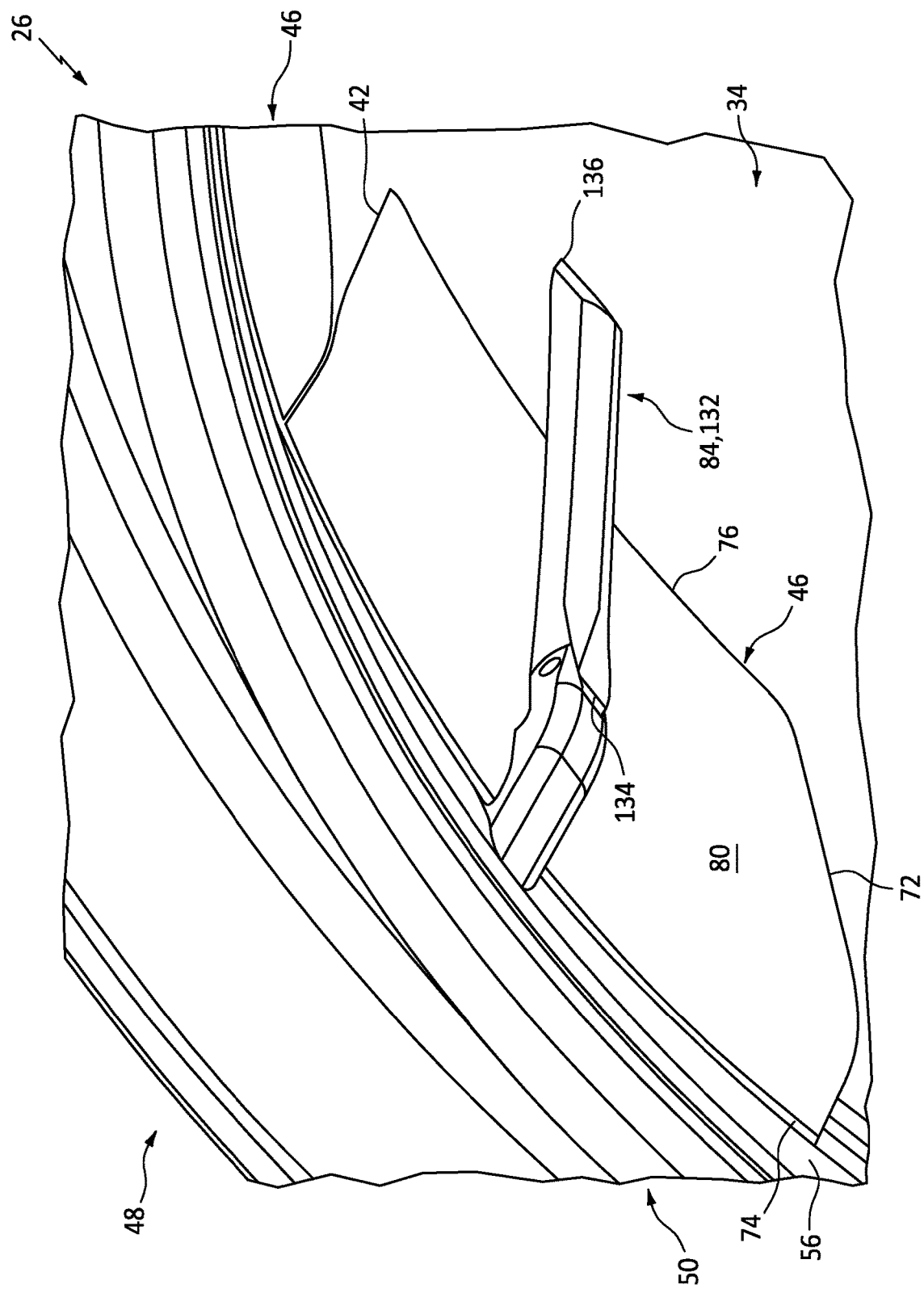
FIG. 16 is a perspective illustration of a portion of another thrust reverser with its blocker doors stowed.
Figure 17:
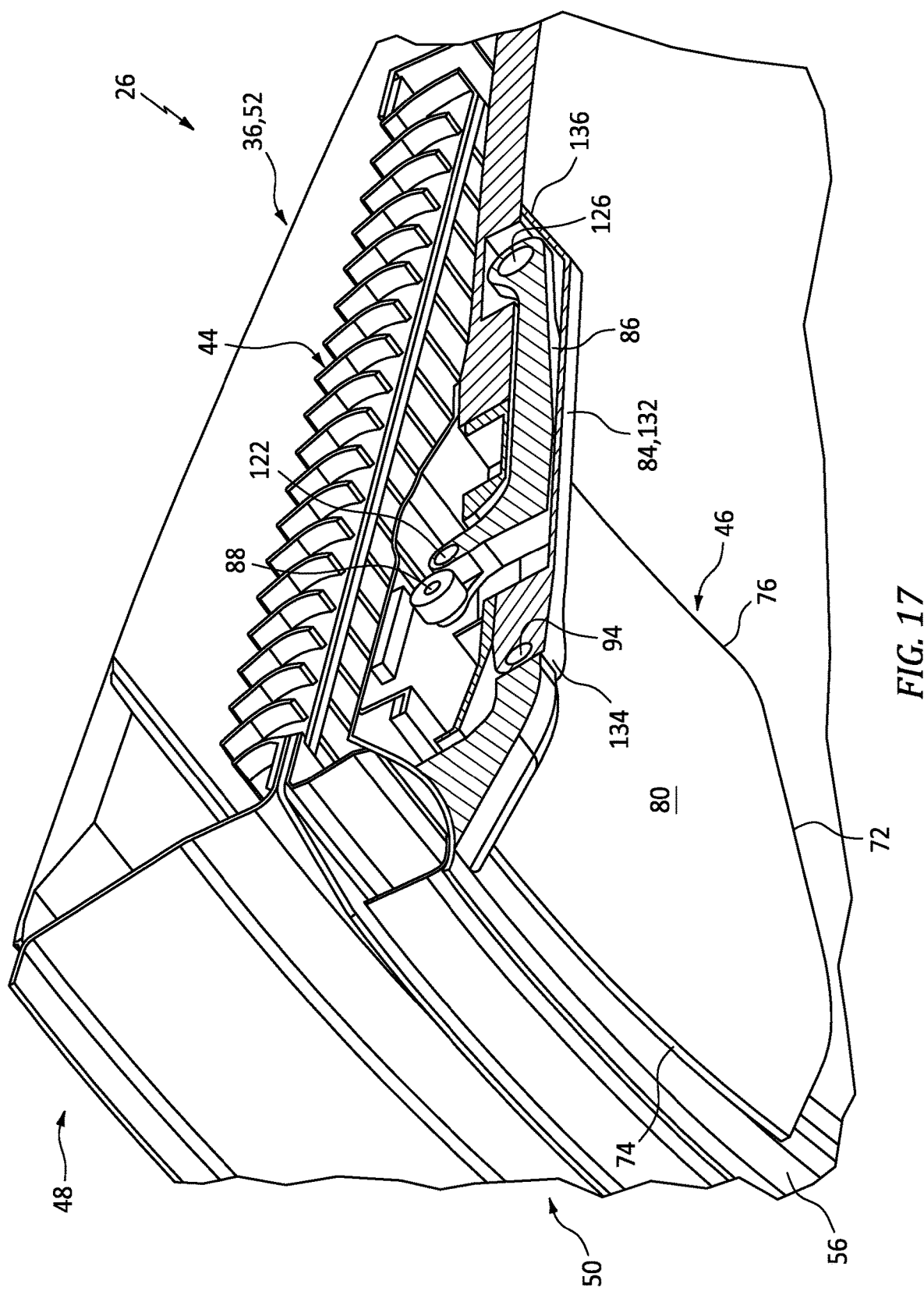
FIG. 17 is a perspective cutaway illustration of a portion of the thrust reverser of FIG. 16.

In some embodiments, referring to FIGS. 16 and 17, each blocker door 46 may be configured without a door channel 128 (see FIGS. 6A and 6B). The structure link 84 and the door link 86 of FIG. 17, for example, may be substantially or completely disposed radially inboard of the door surface 80 when the thrust reverser 26 in its stowed arrangement. The structure link 84 and the door link 86 extend longitudinally along the door surface 80, rather than within a door channel in the blocker door 46. Here, the structure link 84 forms an entirety of the fairing 132. The door link 86 is nested within a channel of the fairing 132 and (e.g., completely) covered by the fairing 132. The door link 86 of FIG. 17 may thereby not be exposed to the air within the bypass flowpath 34 when the thrust reverser 26 in its stowed arrangement; see also FIG. 16.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. An assembly for an aircraft propulsion system, comprising:
    a translating structure configured to translate between a stowed position and a deployed position; and
    a thrust reverser including a blocker door, an actuation linkage and a fairing;
    the blocker door pivotally coupled to the translating structure, the blocker door including a door surface and a channel that projects into the blocker door from the door surface, the door surface forming an outer peripheral boundary of a flowpath when the translating structure is in the stowed position, and the door surface projecting into the flowpath when the translating structure is in the deployed position;
    the actuation linkage pivotally coupled to the blocker door, and the actuation linkage disposed in the channel when the translating structure is in the stowed position; and
    the fairing projecting away from the door surface into the flowpath, and the fairing forming an aerodynamic cover over the channel when the translating structure is in the stowed position;
    wherein, when the translating structure is in the stowed position, the fairing tapers in a direction towards the door surface as the fairing extends longitudinally to an upstream end of the fairing.

2. The assembly of claim 1, wherein a lateral width of the fairing is greater than a lateral width of the channel.

3. The assembly of claim 1, wherein the fairing laterally overlaps a portion of the door surface adjacent the channel.

4. The assembly of claim 1, wherein at least a portion of the fairing is configured as part of the blocker door.

5. The assembly of claim 1, wherein at least a portion of the fairing is configured as part of the actuation linkage.

6. The assembly of claim 1, further comprising:
a fixed structure;
the actuation linkage operatively coupling the blocker door to the fixed structure.

7. The assembly of claim 6, wherein the actuation linkage includes
a structure link pivotally coupled to the fixed structure; and
a door link extending between and pivotally coupled to the structure link and the blocker door.

8. The assembly of claim 7, wherein at least a portion of the fairing is configured as part of the structure link.

9. The assembly of claim 7, wherein the door link comprises a crank arm.

10. The assembly of claim 1, further comprising a fixed cascade structure projecting into an internal cavity of the translating structure when the translating structure is in the stowed position.

11. An assembly for an aircraft propulsion system, comprising:
a translating structure configured to translate between a stowed position and a deployed position; and
a thrust reverser including a blocker door, an actuation linkage and a fairing;
the blocker door pivotally coupled to the translating structure, the blocker door including a door surface and a channel that projects into the blocker door from the door surface, the door surface forming an outer peripheral boundary of a flowpath when the translating structure is in the stowed position, and the door surface projecting into the flowpath when the translating structure is in the deployed position;
the actuation linkage pivotally coupled to the blocker door, and the actuation linkage disposed in the channel when the translating structure is in the stowed position; and
the fairing projecting away from the door surface into the flowpath, and the fairing forming an aerodynamic cover over the channel when the translating structure is in the stowed position;
wherein, when the translating structure is in the stowed position, the fairing tapers in a direction towards the door surface as the fairing extends longitudinally to a downstream end of the fairing.

12. An assembly for an aircraft propulsion system, comprising:
a translating structure configured to translate between a stowed position and a deployed position; and
a thrust reverser including a blocker door, an actuation linkage and a fairing;
the blocker door pivotally coupled to the translating structure, the blocker door including a door surface and a channel that projects into the blocker door from the door surface, the door surface forming an outer peripheral boundary of a flowpath when the translating structure is in the stowed position, and the door surface projecting into the flowpath when the translating structure is in the deployed position;
the actuation linkage pivotally coupled to the blocker door, and the actuation linkage disposed in the channel when the translating structure is in the stowed position; and
the fairing projecting away from the door surface into the flowpath, and the fairing forming an aerodynamic cover over the channel when the translating structure is in the stowed position;
wherein, when the translating structure is in the stowed position, the fairing projects longitudinally out from an upstream end of the blocker door.

13. An assembly for an aircraft propulsion system, comprising:
a translating structure configured to translate between a stowed position and a deployed position; and
a thrust reverser including a blocker door, an actuation linkage and a fairing;
the blocker door pivotally coupled to the translating structure, the blocker door including a door surface and a channel that projects into the blocker door from the door surface, the door surface forming an outer peripheral boundary of a flowpath when the translating structure is in the stowed position, and the door surface projecting into the flowpath when the translating structure is in the deployed position;
the actuation linkage pivotally coupled to the blocker door, and the actuation linkage disposed in the channel when the translating structure is in the stowed position; and
the fairing projecting away from the door surface into the flowpath, and the fairing forming an aerodynamic cover over the channel when the translating structure is in the stowed position;
wherein, when the translating structure is in the stowed position, the fairing projects longitudinally out from a downstream end of the blocker door.

14. An assembly for an aircraft propulsion system, comprising:
a fixed structure;
a translating structure configured to translate between a stowed position and a deployed position; and
a thrust reverser including a blocker door, an actuation linkage and a fairing;
the blocker door pivotally coupled to the translating structure, the blocker door including a door surface and a channel that projects into the blocker door from the door surface, the door surface forming an outer peripheral boundary of a flowpath when the translating structure is in the stowed position, and the door surface projecting into the flowpath when the translating structure is in the deployed position;
the actuation linkage pivotally coupled to the blocker door, and the actuation linkage disposed in the channel when the translating structure is in the stowed position;
the fairing projecting away from the door surface into the flowpath, and the fairing forming an aerodynamic cover over the channel when the translating structure is in the stowed position;
the actuation linkage operatively coupling the blocker door to the fixed structure, wherein the actuation linkage includes
a structure link pivotally coupled to the fixed structure; and
a door link extending between and pivotally coupled to the structure link and the blocker door; and
wherein at least a portion of the fairing is configured as part of the door link.

* * * * *